United States Patent
Honko (10) Patent No.: US 11,124,239 B2
(45) Date of Patent: Sep. 21, 2021

(54) VEHICLE BODY SIDE STRUCTURE AND PARTITION MEMBER

(71) Applicant: HONDA MOTOR CO., LTD., Tokyo (JP)

(72) Inventor: Masanori Honko, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/825,417

(22) Filed: Mar. 20, 2020

(65) Prior Publication Data
US 2020/0307706 A1    Oct. 1, 2020

(30) Foreign Application Priority Data
Mar. 28, 2019    (JP) .............................. JP2019-065054

(51) Int. Cl.
*B62D 25/02* (2006.01)
*B62D 25/04* (2006.01)
*B62D 29/00* (2006.01)

(52) U.S. Cl.
CPC ........... *B62D 25/02* (2013.01); *B62D 25/025* (2013.01); *B62D 25/04* (2013.01); *B62D 29/002* (2013.01)

(58) Field of Classification Search
CPC ...... B62D 25/02; B62D 25/04; B62D 25/025; B62D 25/2036; B62D 29/002

USPC .............................. 296/193.06, 209, 187.02
See application file for complete search history.

(56) References Cited

FOREIGN PATENT DOCUMENTS

| JP | S59-63080 U | 4/1984 |
| JP | 2003-237624 A | 8/2003 |

OTHER PUBLICATIONS

Office Action received in corresponding Japanese application No. 2019-065054 dated Feb. 2, 2021 with English translation (5 pages).

*Primary Examiner* — Dennis H Pedder
(74) *Attorney, Agent, or Firm* — Rankin, Hill & Clark LLP (57) ABSTRACT

The present invention provides a vehicle body side structure including a partition member that is improved comparing a conventional structure in its partitioning property for foamable resin when the foamable resin is injected into a hollow portion of a center pillar. The vehicle body side structure of the present invention includes: a side sill extending in a vehicle front-rear direction; a center-pillar outer part extending upward on the side sill; a center-pillar inner part disposed inward in a vehicle width direction of the center-pillar outer part; the partition member placed in a hollow portion formed by the center-pillar outer part and the center-pillar inner part, and extending in the vehicle front-rear direction, wherein both of end portions of the partition member in the vehicle front-rear direction are inclined downward.

6 Claims, 5 Drawing Sheets

VEHICLE BODY SIDE STRUCTURE AND PARTITION MEMBER

CROSS REFERENCE TO RELATED APPLICATIONS

The present invention relates to and asserts priority from Japanese patent application No. 2019-065054 filed on Mar. 28, 2019, and incorporates the entirety of the contents and subject matter of the above application herein by reference.

TECHNICAL FIELD

The present invention relates to a vehicle body side structure and a partition member.

BACKGROUND ART

A conventionally well-known one of vehicle body side structures is provided with a foam base-material and a partition member at a closed cross section of a pillar in order to improve soundproofing of a vehicle body (see, for example, PTL 1 listed at the end of this description).

The partition member of PTL 1 is formed in a rectangular shape in accordance with a shape of the closed cross section of the pillar. Such a partition member is welded to an inner wall surface of the pillar to be fixed so as to vertically partition a hollow portion of the pillar.

SUMMARY OF INVENTION

Technical Problem

However, the shape of the closed cross-section of a recent center pillar becomes complicated accompanying improvement in strength of the pillar. In particular, the bottom portion of the center pillar is formed to be wider at a junction with a side sill and gradually becoming narrower as it goes upward. And placing the conventional partition member (for example, refer to PTL 1) at the closed cross section of the complicated center pillar results in an inadequate close contact of a periphery of the partition member with the inner wall surface of the center pillar, which may cause foamable resin to leak out.

Solution to Problem

An object of this invention is to provide a vehicle body side structure and a partition member, wherein the vehicle body side structure includes the partition member having improved partitioning property for the foamable resin injected into the hollow portion of the center pillar.

The vehicle body side structure of the present invention solving the above problems includes a side sill extending in a vehicle front-rear direction, a center-pillar outer part extending upward from the side sill, a center-pillar inner part disposed inward of the center-pillar outer part in a vehicle width direction, and a partition member that is placed in a hollow portion formed by the center-pillar outer part and the center-pillar inner part and extends in the vehicle front-rear direction, wherein both distal end portions of the partition member in the vehicle front-rear direction are inclined downward.

Further, the partition member of the present invention solving the above problems partitions the hollow portion of the center pillar into upper and bottom portions, and both distal end portions of the partition member in the vehicle front-rear direction are inclined downward.

Advantageous Effects of Invention

The present invention provides a vehicle body side structure and a partition member, wherein the vehicle body side structure includes the partition member having improved partitioning property comparing the conventional art for the foamable resin injected into the hollow portion of the center pillar.

DESCRIPTION OF EMBODIMENTS

Next, detailed description is given of a vehicle body side structure according to an embodiment that is a mode for carrying out the present invention, with reference to the drawings as appropriately as needed. Note that arrow directions indicating top-bottom and front-rear in the referenced drawings coincide with top-bottom and front-rear directions of the vehicle body. In addition, arrow directions indicating an inside and outside in the drawings coincide with inside and outside directions in the vehicle width direction.

The vehicle body side structure according to a present embodiment is configured such that a hollow portion of a center pillar connected to a side sill is partitioned in a top-bottom direction by a partition member.

The main feature of the partition member in the vehicle body side structure of the present embodiment is that both distal end portions in the vehicle front-rear direction are inclined downward.

Description is given below of the partition member by taking as an example one that partitions the hollow portion of the center pillar to form a foamable-resin chamber. Incidentally, the filling structure of the foamable resin in the center pillar works to prevent road noise and wind noise generated on traveling from being transmitted to an occupant, which wind noise is generated by a member constructing the vehicle body.

Such a vehicle body side structure according to the present embodiment may be applied to both right and left sides of the vehicle body.

However, description is given of only a left-side structure arranged on a left side of the vehicle body, and description is omitted of a right-side structure arranged on a right side of the vehicle body, which right-side structure has a symmetrical structure to the left-side one with respect to a center line in and perpendicular to the vehicle width direction.

Figure 1:
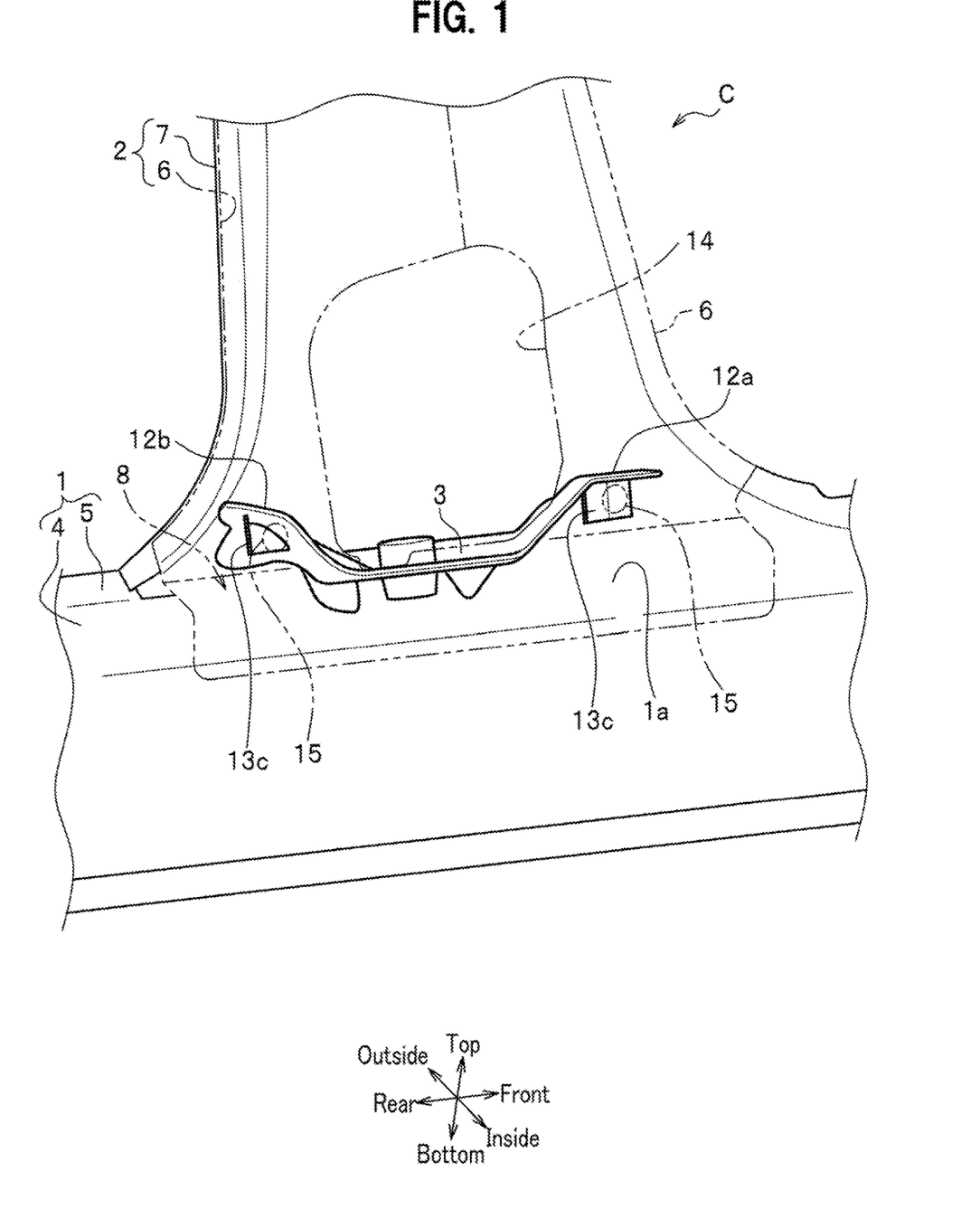
FIG. 1 is a partially enlarged perspective view of a vehicle body side structure according to an embodiment of the present invention.

FIG. 1 is a partially enlarged perspective view of a vehicle body side structure C according to the present embodiment.

Note that FIG. 1 indicates a center-pillar inner part 6 with an imaginary line (two-dot chain line) for a convenience of drawing a figure showing an inside of a hollow portion 8 of a center pillar 2.

As shown in FIG. 1, the vehicle body side structure C includes a side sill 1, a center pillar 2, and a partition member 3.

<<Side Sill>>

As shown in FIG. 1, the side sill 1 is disposed at a side of the vehicle body in a manner of extending in the front-rear direction.

The side sill 1 includes a side-sill inner part 4 disposed inward in the vehicle width direction and a side-sill outer part 5 disposed outward in the vehicle width direction.

And the side-sill inner part 4 exhibits a hat shape (not shown) that opens outward in a vehicle width direction in a cross sectional view taken along a direction intersecting a vehicle front-rear direction. The side-sill outer part 5 has a hat shape (not shown) that opens inward in the vehicle width direction in a cross-sectional view taken in a direction intersecting the vehicle front-rear direction.

The side-sill inner part 4 and the side-sill outer part 5 are joined by spot welding or the like at respective flanges corresponding to brims of the hat shapes. This integrates bulging portions corresponding to peak portions of the hat-shapes into one body to allow the side sill 1 to form a closed cross section.

The side sill 1 has, on its upper surface 1a, a round hole 30 (see FIG. 3A) formed to serve as a fitting hole for the partition member 3.

The above-described side sill 1 is provided inside it with a plurality of reinforcing members, each having a substantially L shape in cross-sectional view, although not shown.

These reinforcing members are arranged at an upper corner portion and a lower corner portion of the hat-shape peak portion of the side-sill inner part 4 in a manner of extending in the vehicle front-rear direction. In addition, the reinforcing members are also arranged at an upper corner portion and a lower corner portion of the hat-shape peak portion of the side-sill outer part 5 in a manner of extending in the vehicle front-rear direction.

<<Center Pillar>>

As shown in FIG. 1, the center pillar 2 is a columnar object extending in the top-bottom direction at the vehicle body side.

A bottom portion of the center pillar 2 is connected to the side sill 1. The top portion of the center pillar 2 is connected to a roof side-rail, which is not shown in the drawings.

Note that the center pillar 2 of the present embodiment is gradually inclined rearward at a slight angle from the bottom to the top.

The above-described center pillar 2 includes a center-pillar inner part 6 disposed inward in the vehicle width direction, and a center-pillar outer part 7 disposed outward in the vehicle width direction.

<Center-Pillar Inner Part>

As shown in FIG. 1, the center-pillar inner part 6 is formed of a substantially plate-shaped object extending upward from its bottom connected to the side sill 1.

The center-pillar inner part 6 forms a general outer shape of the center pillar 2 in a side view seen from the inside in the vehicle width direction. Specifically, the center-pillar inner part 6 is formed wider at its bottom portion nearer the side sill 1, and extends in a manner of becoming gradually narrower in its width in the vehicle front-rear direction as it goes upward. Particularly, both ends in the vehicle front-rear direction of the bottom portion of the center-pillar inner part 6 are gently curved so as to be convex downward.

The center pillar 2 in the present embodiment is slightly inclined rearward as described above, which makes the center pillar 2 formed such that a curve formed at a front portion in the vehicle front-rear direction exhibits more gentle circular arc than the curve formed at a rear portion.

In addition, the center-pillar inner part 6 includes a substantially rectangular opening 14 approximately at a center thereof in the vehicle front-rear direction in a bottom portion.

The opening 14 communicates an inside and outside of the hollow portion 8 of the center pillar 2 inward in the vehicle width direction and serves as an insertion hole for placing the partition member 3 to the hollow portion 8 of the center pillar 2 as described in detail below.

Further, the center-pillar inner part 6 has foamable-resin filling holes 15 formed at its bottom portion, which is described below. These filling holes 15 are formed in a pair in a manner of being aligned in the vehicle front-rear direction. These filling holes 15 communicate with the below-mentioned foamable-resin chamber 17 (see FIG. 5) formed between the partition member 3 and an upper surface 1a of the side sill 1.

The filling holes 15 are disposed respectively below a first vertical wall 12a and a second vertical wall 12b, described below, of the partition member 3, which vertical walls are disposed respectively near below two corners of the opening 14 in the vehicle front-rear direction.

<Center-Pillar Outer Part>

Next, description is given of the center-pillar outer part 7 (see FIG. 1).

The center-pillar outer part 7 has a hat shape that opens inward in the vehicle width direction in a cross-sectional view taken in a direction intersecting the vehicle front-rear direction.

Both ends of a flange of the center-pillar outer part 7 corresponding to the brim of the hat-shape are joined to both of the front and rear ends of the center-pillar inner part 6 in the vehicle front-rear direction by spot welding or the like.

Thereby, as shown in FIG. 1, the center-pillar outer part 7 is formed wider nearer the side sill 1 and extends upward with its width gradually narrowing in the vehicle front-rear direction as in accordance with the shape of the center pillar inner part 6.

And, the center-pillar outer part 7 forms the above-described hollow portion 8 between its bulging portion corresponding to the hat-shape peak portion and the center-pillar inner part 6, although not shown.

As shown in FIG. 1, the center-pillar outer part 7 has side surfaces in the vehicle front-rear direction, both extending and broadening from top to bottom. And bottom portions of the both side surfaces of the center-pillar outer part 7 extend along the upper surface 1a of the side sill 1.

The above-mentioned bottom portions of the center-pillar outer part 7 are connected to the upper surface 1a of the side sill 1 by spot welding or the like.

<<Partition Member>>

Next, the partition member 3 (see FIG. 1) is described.

Figure 2A:
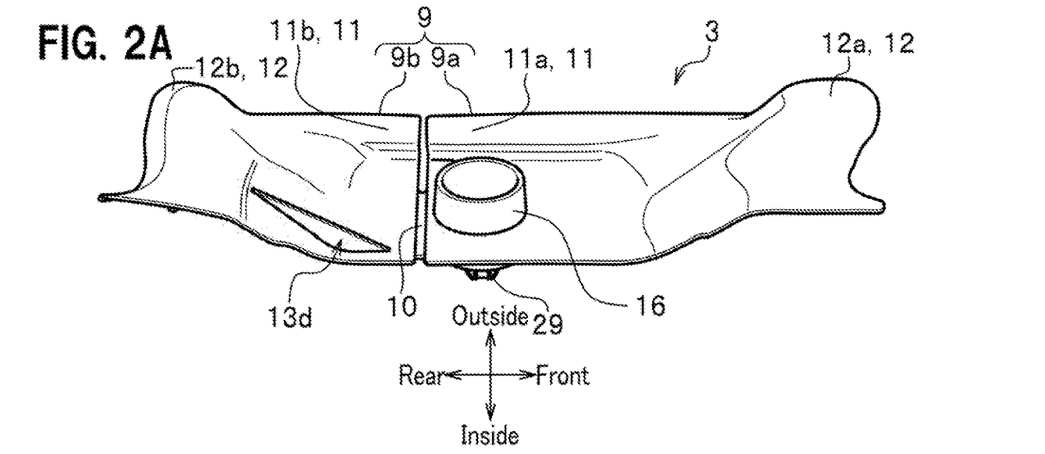
FIG. 2A is a general perspective view of a partition member as viewed from an obliquely upward direction and in a vehicle width direction.
Figure 2B:
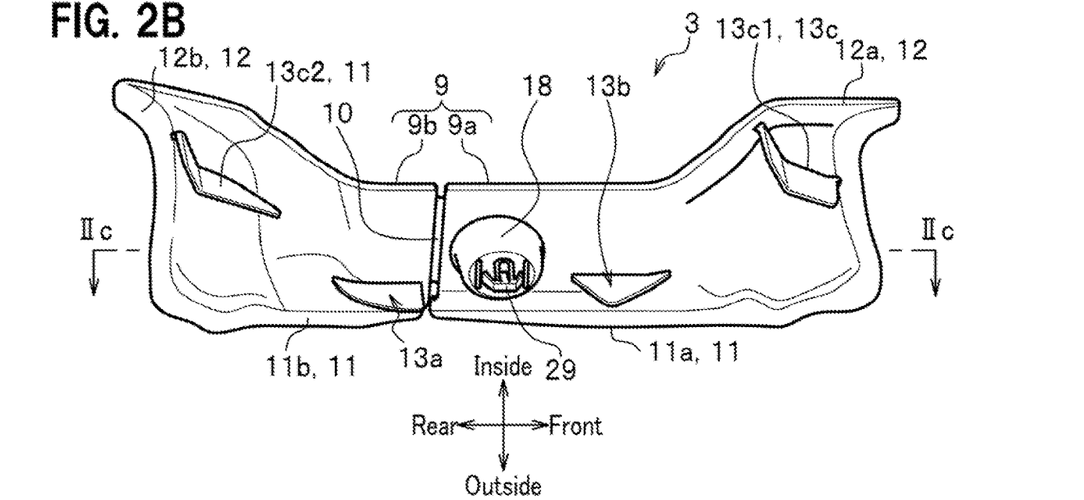
FIG. 2B is an general perspective view of the partition member as viewed from an obliquely downward direction and an inside in the vehicle width direction.
Figure 2C:
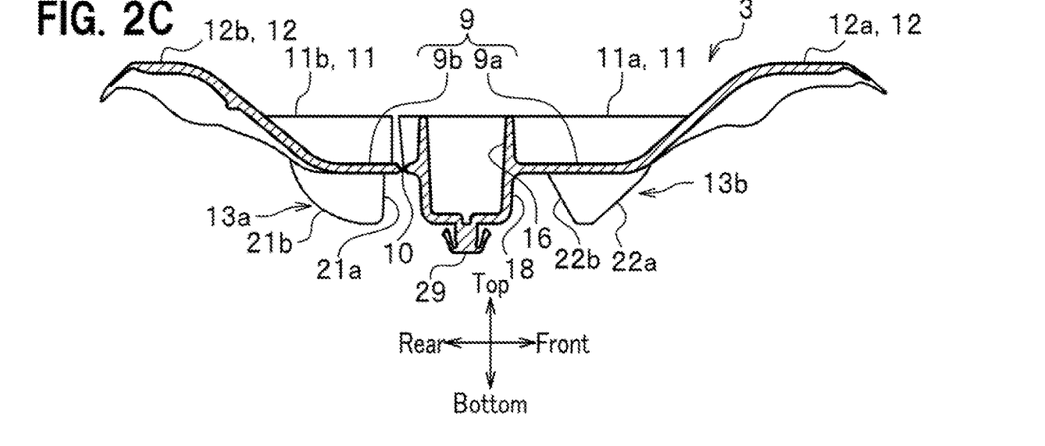
FIG. 2C Is a sectional view taken along a line IIc-IIc in FIG. 2B.

FIG. 2A is a general perspective view of the partition member 3 as viewed downward from obliquely upward in the vehicle width direction; FIG. 2B is a general perspective view of the partition member 3 as viewed upward from an obliquely downward in the vehicle width direction. FIG. 2C is a sectional view taken along a line IIc-IIc in FIG. 2B.

As shown in FIG. 2A to FIG. 2C, the partition member 3 mainly consists of a partition main body 9, a vertical wall 12, a side wall 11, a recess portion 18, and a rib 13.

The partition member 3 in the present embodiment is assumed to be a synthetic resin molded product.

<Partition Main Body>

As shown in FIGS. 2A to 2C, the partition main body 9 is mainly composed of plates: a first half plate 9a disposed frontward in the vehicle front-rear direction; a second half plate 9b disposed rearward in the front-rear direction, which half plates are integrally formed via the folding portion 10 interposed therebetween. Note that the first half plate 9a and the second half plate 9b may be joined via the folding portion 10.

The partition main body 9 is disposed substantially parallel to the upper surface 1a of the side sill 1 (see FIG. 1).

The folding portion 10 is thinner than a general portion of the partition main body 9 and forms a hinge connecting the first half plate 9a and the second half plate 9b; which means that the partition main body 9 has a structure that can be restorably folded at the folding portion 10. Specifically, the partition main body 9 can be ridge-folded around the folding portion 10 extending in the vehicle width direction, in such a folding direction that lower surfaces of the first half plate 9a and the second half plate 9b face each other.

In addition, the folding portion 10 of this embodiment is formed by being shifted more rearward than a central portion of the partition main body 9, which means that the first half plate 9a is longer than the second half plate 9b in the vehicle front-rear direction.

<Vertical Wall>

As shown in FIG. 2A, the vertical walls 12 includes a first vertical wall 12a disposed frontward in the vehicle front-rear direction on the first half plate 9a and a second vertical wall 12b disposed rearward in the vehicle front-rear direction on the second half plate 9b.

<First Vertical Wall>

As shown in FIG. 2C, the first vertical wall 12a is inclined to gradually extend upward as it goes toward the front in the vehicle front-rear direction, and curves slightly to be convex obliquely upward in a rearward direction.

Moreover, a distal end portion of the first vertical wall 12a, as shown in FIG. 2C, inclines to gradually extend downward as it goes forward in the vehicle front-rear direction.

And the distal end portion of the first vertical wall 12a becomes gradually thinner as it extends frontward.

The above-described downward inclining of the distal end portion of the first vertical wall 12a makes itself disposed along an inner wall surface of the center pillar 2 disposed forward in the vehicle front-rear direction, as described below.

<Second Vertical Wall>

As shown in FIG. 2C, the second vertical wall 12b is inclined to gradually extend upward as it goes rearward in the vehicle front-rear direction, and slightly curved to be convex obliquely upward in the forward direction.

Further, as shown in FIG. 2C, the distal end portion of the second vertical wall 12b is inclined to gradually extend downward as it goes rearward in the vehicle front-rear direction.

And the distal end portion of the second vertical wall 12b becomes gradually thinner as it extends rearward.

The above-described downward inclination of the distal end portion of the second vertical wall 12b makes itself disposed along an inner wall surface of the center pillar 2 disposed rearward in the vehicle front-rear direction, as described below.

Note that an angle of the downward inclination of the distal end portion of the first vertical wall 12a may be the same as or different from that of the distal end portion of the second vertical wall 12b.

In the description below, the first vertical wall 12a and the second vertical wall 12b are simply referred to as "vertical walls 12", when both walls do not need to be distinguished from each other.

<Side Wall>

As shown in FIG. 2A, the side walls 11 includes a first side wall 11a and a second side wall 11b.

The first side wall 11a is formed so as to rise upward from an edge outward in the vehicle width direction of the first half plate 9a of the partition member 3.

The second side wall 11b is formed so as to rise upward from an edge outward in the vehicle width direction of the second half plate 9b of the partition member 3.

And the first side wall 11a is formed to range from the first half plate 9a to the first vertical wall 12a. The second side wall 11b is formed to range from the second half plate 9b to the second vertical wall 12b.

The above-described structure makes the first side wall 11a and the second side wall 11b enhance rigidity of the partition member 3.

Further, the first side wall 11a and the second side wall 11b suppress a V-shaped deformation of the partition main body 9 by interfering with each other when the partition member 3 is to be bent into a V shape at the folding portion, which means that the folding at the folding portion of the partition member 3 may be only the ridge-shape deformation.

The description below simply refers to the first side wall 11a and the second side wall 11b as "side walls 11" when it is not needed to distinguish them from each other.

<Recess Portion>

As shown in FIGS. 2B and 2C, the recess portion 18 is formed in the partition main body 9 at its center in the vehicle width direction and in the vehicle front-rear direction.

This embodiment has the recess portion 18 formed near the folding portion 10 of the first half plate 9a.

The recess portion 18 is formed by making the partition main body 9 partially recessed downward in a substantially bottomed cylindrical shape.

The above structure forms the recess portion 18 to protrude from the partition main body 9 downward, as shown in FIG. 2B and FIG. 2C.

Further, a clip 29 is provided on a bottom surface of the recess portion 18, which bottom surface is opposed to the upper surface 1a (see FIG. 1) of the side sill 1 (see FIG. 1).

When the clip 29 engages with the upper surface 1a of the side sill 1, the recess portion 18 works as a spacer that separates away the upper surface 1a and the partition main body 9 at a predetermined interval. Incidentally, the partition member 3 in this embodiment includes only one such clip 29.

As shown in FIG. 2C, a circular opening formed on an upper surface of the partition main body 9 by the recess portion 18 has a cylindrical wall portion 16 formed, which wall portion 16 has an inner diameter equal to the circular opening.

Note that the present embodiment sets a height of a top of the wall portion 16 equal to that of a top of the side walls 11 as shown in FIG. 2C.

The clip 29 is configured to snap-fit with a round hole 30 (see FIGS. 3A to 3C), which is described below, formed on the upper surface 1a of the side sill 1 (see FIG. 1). The clip 29 of the present embodiment is assumed to be a protrusion having a barb that is caught by a hole periphery behind an insertion port of the round hole 30 when fitted into the round hole 30, but the clip 29 is not limited thereto.

As shown in FIG. 1, the round hole 30 with which the clip 29 engages serves as a main reference point for positioning the partition member 3 with respect to the upper surface 1a of the side sill 1.

<Rib>

As shown in FIGS. 2A to 2C, the rib 13 of this embodiment includes a first rib 13a, a second rib 13b, a third rib 13c, and a fourth rib 13d.

<First Rib>

The first rib 13a is, as shown in FIGS. 2B and 2C, mainly formed of a plate that protrudes downward from a lower surface of the second half plate 9b of the partition main body 9.

The first rib 13a is provided to stand so that its plate surface is directed along the vehicle front-rear direction and perpendicular to the lower surface of the second half plate 9b.

Further, the first rib 13a is formed nearer an outside in the vehicle width direction of the second half plate 9b, and nearer the folding portion.

As shown in FIG. 2C, a protruding length of the first rib 13a from the lower surface of the second half plate 9b is set equal to a protruding length of the recess portion 18 from a lower surface of the first half plate 9a (excluding the clip 29).

The above-described first rib 13a, as shown in FIG. 2C, partially has an arcuate shape in a side view in the vehicle width direction.

Specifically, the first rib 13a has a front side 21a extending downward from the second half plate 9b and an arcuate rear side 21b extending from a bottom end of the front side 21a obliquely upward and rearward in a side view seen in the vehicle width direction. The arcuate rear side 21b is formed so as to be convex forward and obliquely downward. That is, the rear side 21b of the first rib 13a has an arcuate shape in the vehicle front-rear direction.

The above-described arc-shaped rear side 21b of the first rib 13a, as described in detail below, slidably contacts the upper surface 1a of the side sill 1 when the partition member 3 is fixed to the upper surface 1a. Hereinbelow, the first rib 13a is sometimes referred to as "arcuate rib".

<Second Rib>

As shown in FIGS. 2B and 2C, the second rib 13b is formed mainly by a plate that protrudes downward from the lower surface of the first half plate 9a of the partition main body 9.

The second rib 13b is provided to stand so that a plate surface is directed along the vehicle front-rear direction and perpendicular to the lower surface of the first half plate 9a.

Further, the second rib 13b is formed nearer an outside on the first half plate 9a in the vehicle width direction and nearer the front in the vehicle front-rear direction than the recess portion 18.

As shown in FIG. 2C, a protruding length of the second rib 13b from the lower surface of the first half plate 9a is configured as equal to the protruding length of the recess portion 18 from the lower surface of the first half plate 9a (excluding the clip 29).

The above-described second rib 13b, as shown in FIG. 2C, has a shape of substantially upside-down triangle in a side view in the vehicle width direction.

Specifically, the second rib 13b has a bottom apex serving as a boundary between two sides; a front side 22a extending obliquely upward and forward from the bottom apex; and a rear side 22b extending obliquely upward and rearward from the bottom apex, in a side view seen in the vehicle width direction.

The above-described second rib 13b supports the first half plate 9a of the partition main body 9 on the upper surface 1a of the side sill 1 when the partition member 3 is fixed to the upper surface 1a, which is described in detail below. Hereinbelow, the second rib 13b is sometimes referred to as an "upside-down triangular rib".

<Third Rib>

The third rib 13c, as shown in FIG. 2B, is formed at an inner portion in the vehicle width direction mainly by a plate that protrudes downward from a lower surface of the vertical wall 12.

The third rib 13c includes a front third rib 13c1 formed on the first vertical wall 12a and a rear third rib 13c2 formed on the second vertical wall 12b.

Each of the front third rib 13c1 and the rear third rib 13c2 is inclined so that its plate surface extends outward in the vehicle width direction as the rib goes toward the front. Further, each of the third ribs 13c1 and 13c2 is slightly bent generally at its center in the vehicle front-rear direction to be convex outward in the vehicle width direction.

Further, an inner surface in the vehicle width direction of each of the front third rib 13c1 and the rear third rib 13c2 faces at a position corresponding to their folding portion to each of the filling holes 15 of the center-pillar inner part 6 that are shown in FIG. 1.

Each of the front third rib 13c1 and the rear third rib 13c2 works as a baffle plate for foamable resin injected when the foamable resin is filled into the hollow portion 8 of the center pillar 2 through each of the filling holes 15. The third rib 13c is sometimes referred to as a "baffle rib" hereinbelow.

<Fourth Rib>

The fourth rib 13d, as shown in FIG. 2A, is formed at an inner portion in the vehicle width direction mainly of a triangular plate facing the second side wall 11b. The fourth rib 13d is arranged within an internal angle formed by the second half plate 9b and the second vertical wall 12b so as to connect the second half plate 9b and the second vertical wall 12b.

The fourth rib 13d, as described in detail below, increases rigidity of the partition member 3 on the surface provided with the first rib 13a (arcuate rib) that is to come into sliding contact with the upper surface 1a of the side sill 1. Hereinbelow, the fourth rib 13d is sometimes referred to as a "reinforcing rib".

<<Manufacturing Method of Vehicle Body Side Structure>>

Hereinbelow, description is given of a manufacturing method of the vehicle body side structure C according to the present embodiment while showing mainly a method of fitting the partition member 3 into the hollow portion 8 of the center pillar 2.

Figure 3A:
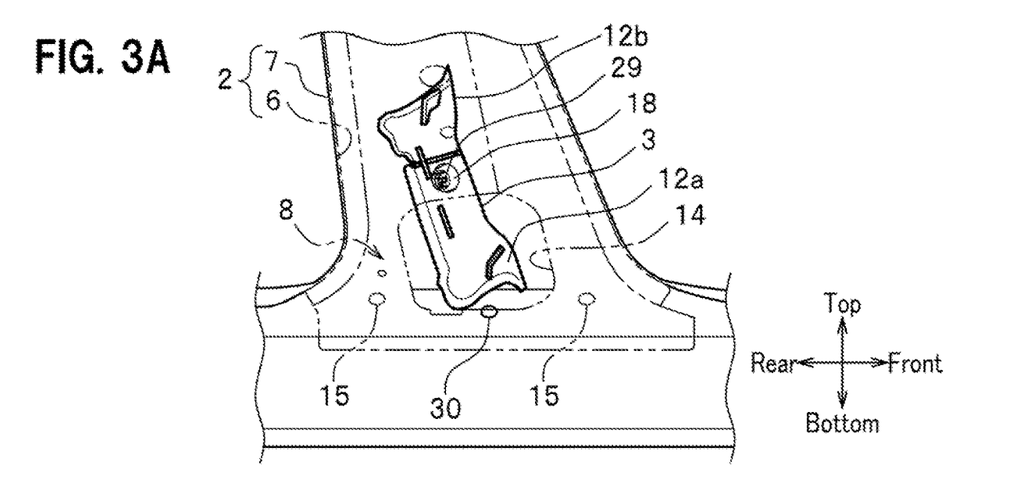
FIGS. 3A to 3C are diagrams illustrating a fixing process of the partition member in a hollow portion of a center pillar.

FIG. 3A is an explanatory drawing of a first step of the method manufacturing the vehicle body side structure C in which step the partition member 3 is inserted into the hollow portion 8 of the center pillar 2.

Figure 3B:
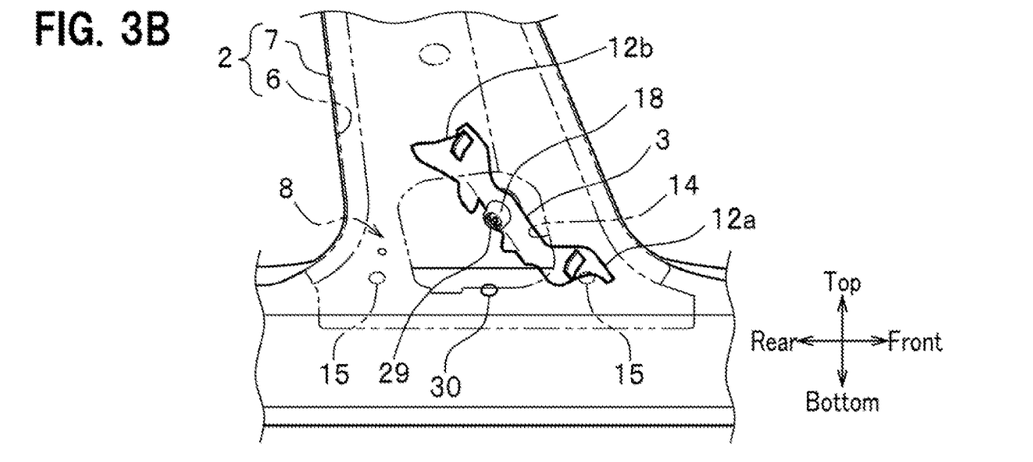

FIG. 3B is an explanatory drawing of a second step of the method manufacturing the vehicle body side structure C in which step the partition member 3 is rotated within the hollow portion 8 of the center pillar 2.

Figure 3C:
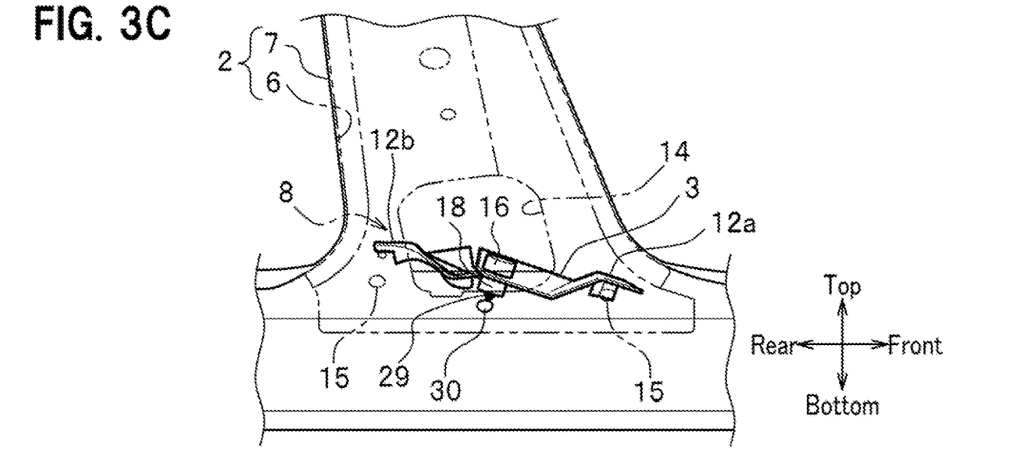

FIG. 3C is an explanatory drawing of a third step of the method manufacturing the vehicle body side structure C in which step the partition member 3 is positioned with respect to the upper surface 1a of the side sill 1.

In FIGS. 3A to 3C, the center-pillar inner part 6 is indicated with a virtual line (two-dot chain line) for convenience of drawing a figure showing the inside of the hollow portion 8 of the center pillar 2.

In FIGS. 3A to 3C, a reference sign 15 denotes the foamable-resin filling hole formed in the center-pillar inner part 6, and a reference sign 30 the round hole formed on the upper surface 1a of the side sill 1 to serve as a fitting hole for the partition member 3.

The first step of this manufacturing method, as shown in FIG. 3A begins to place the partition member 3 from the inside in the vehicle width direction through the opening 14 of the center-pillar inner part 6 into the hollow portion 8 of the center pillar 2.

At this step, the partition member 3 is inserted into the opening 14, starting with its one end in the longitudinal direction.

Note that, the first vertical wall 12a may also be first inserted in the hollow portion 8, although this embodiment first inserts the second vertical wall 12b in the hollow portion 8.

Next, the second step of this manufacturing method, as shown in FIG. 3B, rotates the partition member 3 within the hollow portion 8 so that the recess portion 18 faces downward.

At this step, the partition member 3 is rotated so that the first vertical wall 12a faces frontward in the vehicle front-rear direction and the second vertical wall 12b faces rearward in the vehicle front-rear direction.

Next, the third step of this manufacturing method, as shown in FIG. 3C, disposes the partition member 3 so that its first vertical wall 12a faces the front inner wall of the bottom end portion of the center pillar 2 from below, and then, aligns a position of the clip 29 of the partition member 3 with respect to the round hole 30 formed in the upper surface 1a of the side sill 1.

At this step, as described below, the second vertical wall 12b of the partition member 3 is pivoted downward around the folding portion 10 (see FIG. 4A) by its own weight and thereby hangs down. This makes the partition member 3 bend into a ridge shape around the folding portion 10 (see FIG. 4A).

Note that the present embodiment is assumed that an worker performs the third step while grasping the wall portion 16 (see FIG. 3C) formed on the partition member 3.

Figure 4A:
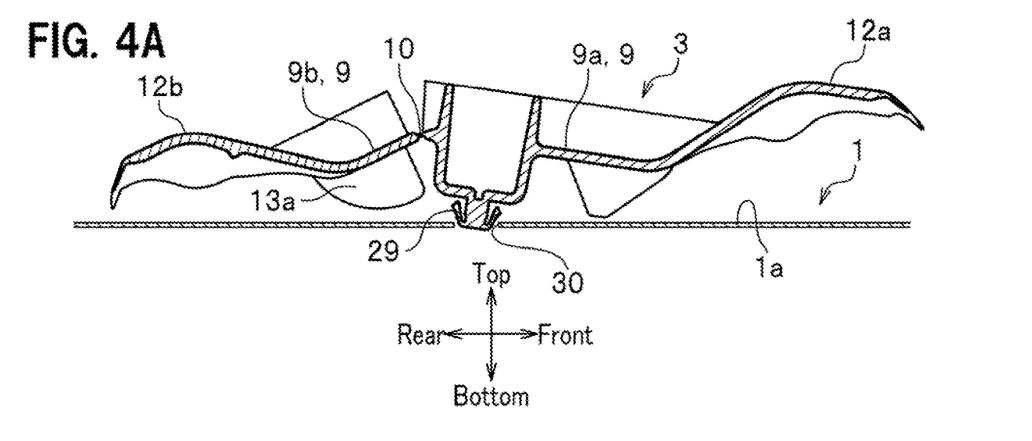
FIGS. 4A to 4C are explanatory diagrams of illustrating motions of a first rib on an upper surface of a side sill when the partition member is fitted in the hollow portion of the center pillar.
Figure 4B:
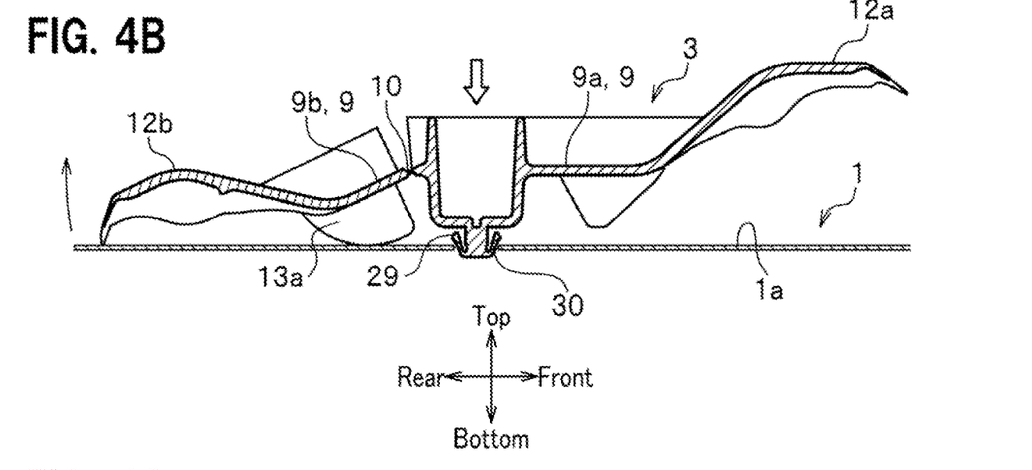

Next, FIG. 4A is a diagram illustrating a state of the partition member 3 when it is positioned with respect to the upper surface 1a of the side sill 1; FIG. 4B is a state diagram of the partition member 3 when the clip 29 of the partition member 3 is being inserted into the round hole 30 of the side sill 1; and FIG. 4C is a state diagram of the partition member 3 after the clip 29 of the partition member 3 is inserted into the round hole 30 of the side sill 1.

Figure 4C:
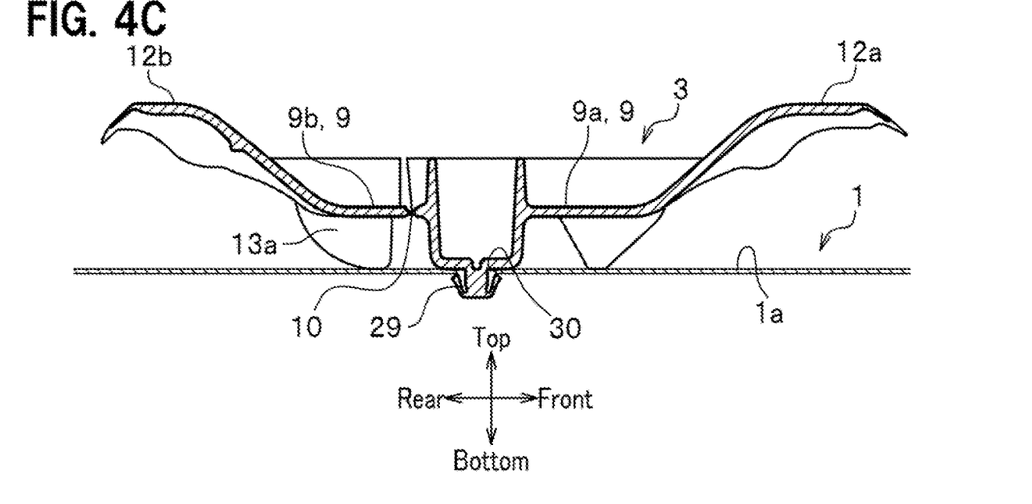

Note that the partition member 3 shown in FIGS. 4A to 4C corresponds to that shown in the cross-sectional view of FIG. 2C.

As shown in FIG. 4A, the partition member 3 is positioned on the upper surface 1a of the side sill 1 by aligning the clip 29 in position with the round hole 30 of the side sill 1.

At this time, the first vertical wall 12a of the partition member 3 faces the front inner wall of the center pillar 2 that curves to protrude downward by ridge-folding the partition member 3 at the folding portion 10 from below (See FIG. 3C).

Further, the second vertical wall 12b of the partition member 3 is pivoted downward around the folding portion 10 by its own weight as described below.

Next, as shown in FIG. 4B, when the first half plate 9a of the partition main body 9 is kept substantially parallel to the upper surface 1a of the side sill 1, a front end of the first vertical wall 12a located at a front portion of the partition member 3 moves upward and comes into contact with the front inner wall of the center pillar 2 (see FIG. 1) from below.

At this time, the distal end portion of the first vertical wall 12a becomes thinner as it goes toward its distal end as described above, and therefore comes into close contact with the front inner wall of the center pillar 2 (see FIG. 1).

Then, the clip 29 is inserted into the round hole 30 by pressing the first half plate 9a toward the side sill 1.

On the other hand, the first rib 13a (arcuate rib) formed on the second half plate 9b that is bent downward comes into contact with the upper surface 1a of the side sill 1 when the clip 29 is inserted into the round hole 30.

The first rib 13a that comes into contact with the upper surface 1a of the side sill 1 receives a reaction force from the upper surface 1a to pivot the second vertical wall 12b upward around the folding portion 10.

This causes the distal end portion of the second vertical wall 12b located at the rear portion of the partition member 3 to move upward to abut against the rear inner wall of the center pillar 2 (refer FIG. 1) from below.

Here, the distal end portion of the second vertical wall 12b becomes thinner as it goes toward its distal end as described above, so that the second vertical wall 12b comes into close contact with the rear inner wall of the center pillar 2.

Incidentally, the second half plate 9b on which the first rib 13a receiving the reaction force from the upper surface 1a is provided with the fourth rib 13d (see FIG. 2A) formed in a manner of extending over the second vertical wall 12b as described above. This makes the fourth rib 13d (reinforcing rib) impart sufficient rigidity to the second half plate 9b on which the first rib 13a (arcuate rib) is formed.

Further, as shown in FIG. 4C, the clip 29 is inserted into the round hole 30 and snap-fitted so that the second half plate 9b is arranged in parallel to the upper surface 1a of the side sill 1.

And then, each of the first rib 13a (arcuate rib), the recess portion 18, and the second rib 13b (upside-down triangular rib) abuts against the upper surface 1a of the side sill 1, and thereby the first half plate 9a and the second half plate 9b are aligned flush with each other in the vehicle front-rear direction and becomes parallel to the upper surface 1a.

This completes a series of steps of fitting the partition member 3 (see FIG. 1) into the hollow portion 8 (see FIG. 1) of the center pillar 2 (see FIG. 1).

Figure 5:
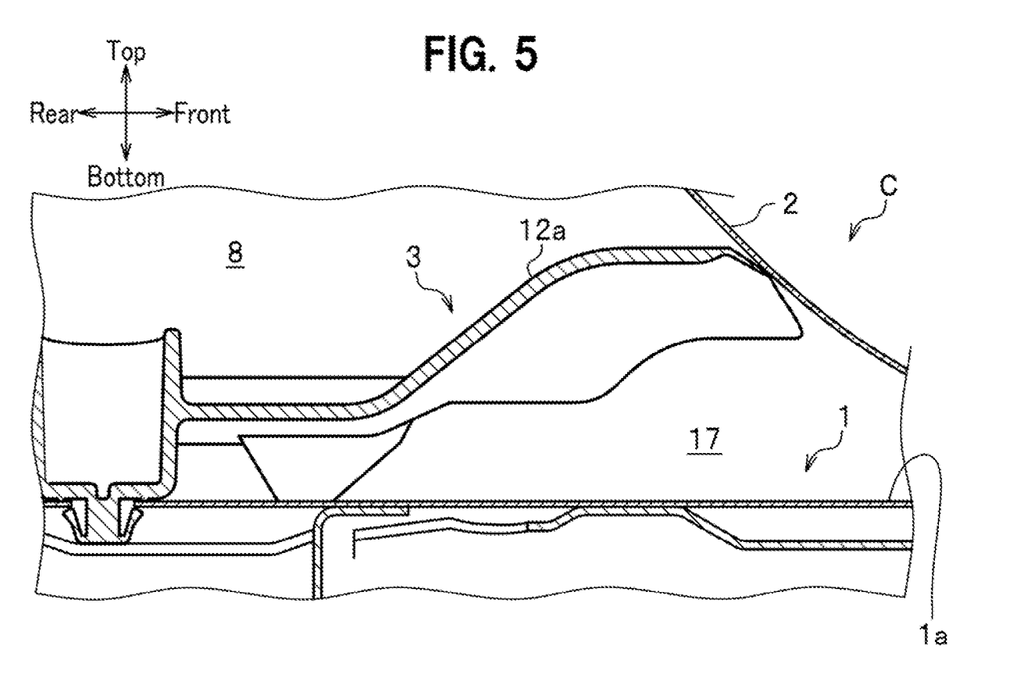
FIG. 5 is a partially enlarged cross-sectional view of the partition member fitted in the hollow portion of the center pillar.

FIG. 5 is a partially enlarged cross-sectional view of the partition member 3 fixed onto the upper surface 1a of the side sill 1.

As shown in FIG. 5, the partition member 3 fitted into the hollow portion 8 of the center pillar 2 forms a foamable-resin chamber 17 between itself and the upper surface 1a of the side sill 1. The foamable-resin chamber 17 communicates with the inside in the vehicle width direction of the center-pillar inner part 6 (see FIG. 1) through the filling hole 15 (see FIG. 1).

As shown in FIG. 5, the front distal end portion of the first vertical wall 12a of the partition member 3 comes into contact with the front inner wall of the center pillar 2 from below.

And, the rear distal end portion of the second vertical wall 12b of the partition member 3 comes into contact with the rear inner wall of the center pillar 2 from below as described above, although not shown.

<<Filling Step of Foamable Resin>>

Next, description is given of a filling step of filling the foamable resin into the foamable-resin chamber 17 (see FIG. 5).

This filling step injects uncured foamable resin (liquid) through the filling hole 15 (see FIG. 1) into the foamable-resin chamber 17 (see FIG. 5), and foams and cures the foamable resin, and thereby, fills the foamable-resin chamber 17 with the cured foamable resin.

Note that this embodiment assumes that the cured foamable resin is hard urethane foam, but it is not limited thereto, and other kind of curable foamable resin may be used.

The hard urethane foam in the present embodiment is produced by foaming original solution of urethane foam and curing the foamed urethane.

The original solution of the urethane foam includes, for example, liquid obtained by mixing polyether polyol with a liquid obtained by pre-mixing foaming agent such as cyclopentane and water and further an auxiliary agent such as a catalyst and a foam stabilizer, and with an isocyanate liquid.

Figure 6:
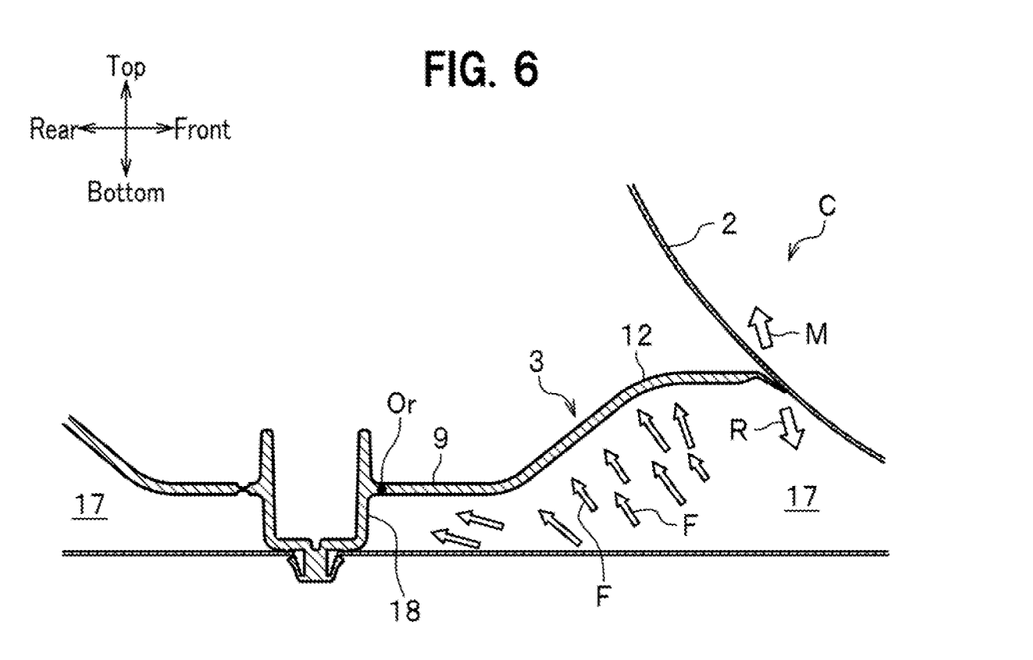
FIG. 6 is an explanatory view of illustrating a motion of the partition member when foamable resin is filled into the hollow portion of the center pillar.

FIG. 6, next referred to, is an explanatory view of explaining how the partition member 3 moves when the foamable-resin chamber 17 of the center pillar 2 is filled with the foamable resin.

As shown in FIG. 6, after the foamable-resin chamber 17 of the center pillar 2 is filled with the foamable resin, the foamable resin starts to foam. Foam object applies a load F to the lower surfaces of the partition main body 9 and the vertical walls 12 from below, the distal end portion of the vertical walls 12 receives an upward moment M generated around an origin "Or" that is a junction of the partition main body 9 and the recess portion 18. This moment M causes a reaction force R from the inner wall of the center pillar 2 to the distal end portion of the vertical wall 12. This results in a close contact of the distal end portion of the vertical walls 12 with the inner wall of the center pillar 2, which close contact prevents the foamable resin from leaking through a boundary between the partition member 3 and the inner wall of the center pillar 2.

The vehicle body side structure C in the present embodiment assumes that the distal end portion of the vertical walls 12 and the inner wall of the center pillar 2 are in close contact with each other when the partition member 3 is fixed to the center pillar 2. Note that, however, the vehicle body side structure C may also include a configuration having a gap present between the distal end portion of the vertical walls 12 and the inner wall of the center pillar 2 when the partition member 3 is fixed to the center pillar 2, only if the gap is eliminated by the close contact of the distal end portion of the vertical walls 12 and the inner wall of the center pillar 2 caused by the vertical walls 12 being pushed up by the foam object made from the foamable resin.

The vehicle body side structure C of this embodiment, as shown in FIG. 1, arranges the third rib 13c of the partition member 3 to make it face the filling hole 15 formed in the center-pillar inner part 6.

When uncured foamable resin is injected through the filling hole 15 (see FIG. 1) into the foamable-resin chamber 17 (see FIG. 5), the uncured foamable resin hits a third rib 13c (see FIG. 1) that works as the baffle plate. Thereafter, a flow direction of the foamable resin is changed by the third rib 13c.

In addition, the third rib 13c of this embodiment, as shown in FIG. 2B, inclines so that its plate surface goes outward in the vehicle width direction as it goes toward the front. Accordingly, the uncured foamable resin is changed in its direction toward the front by the third rib 13c (see FIG. 1), and thereafter, flows down to the upper surface 1a of the side sill 1 (see FIG. 1), and immediately forms a foaming raw material.

The third rib 13c of the present embodiment changes the flow of the uncured foamable resin and spreads the uncured foamable resin over a wider range. Further, the third rib 13c guides the uncured foamable resin to a position where the foam object from the foamable resin fills the foamable-resin chamber 17 more efficiently. This enables the foam object from the foamable resin to be evenly distributed all over the foamable-resin chamber 17.

Here, description is given, as a reference example, of a vehicle body side structure (not shown) that is assumed to include the partition member 3 having none of the third rib 13c.

In this vehicle body side structure of the reference example, when uncured foamable resin is injected through the filling hole 15 into the foamable-resin chamber 17, the uncured foamable resin accumulates as liquidus foamable resin nearer outward in the vehicle width direction on the upper surface 1a of the side sill 1. Thereafter, when the crosslinking reaction starts, the liquid foamable resin foams unevenly turns into foam nearer outward in the vehicle width direction in the foamable-resin chamber 17, and the foam object gradually fills the foamable-resin chamber 17.

On the other hand, in the vehicle body side structure C of the present embodiment, the third rib 13c (baffle rib) guides the uncured foamable resin to a suitable foaming position as described above. Such a vehicle body side structure C is able to spread the foam object from the foamable resin evenly all over the foamable-resin chamber 17 more reliably.

Further, in such a vehicle body side structure C, the direction of the third rib 13c is not limited to the one in which its plate surface is inclined so that the plate surface goes outward in the vehicle width direction as it goes toward the front, as described above, and accordingly, the direction is able to be appropriately changed in accordance with a direction in which the uncured foamable resin is desired to be guided in the foamable-resin chamber 17.

<<Effects of enbodiment>>

Next, description is given of effects achieved by the vehicle body side structure C of the present embodiment.

The vehicle body side structure C of the present embodiment has both end portions of the partition member 3 in the vehicle front-rear direction, that is, the distal end portions of the vertical walls 12, inclined downward.

Such a vehicle body side structure C, when the foamable resin is filled in the hollow portion 8 of the center pillar 2, has both end portions of the partition member 3 (both end portions of the vertical walls 12) and the inner wall of the center pillar 2 come into close contact with each other, which prevents the foamable resin from leaking out through the boundary between the partition member 3 and the inner walls of the center pillar 2.

Further, the vehicle body side structure C has the folding portion 10 at which the partition member 3 is folded in a ridge shape.

Such a vehicle body side structure C is able to easily make the both ends of the partition member 3 in the front-rear direction face respectively the inner walls in the front-rear direction of the center pillar 2, which inner walls curve to be convex downward. This allows both ends of the partition member 3 and the inner walls of the center pillar 2 to be brought into close contact with each other more reliably than otherwise, when the foamable resin is filled in the hollow portion 8 of the center pillar 2.

Further, the vehicle body side structure C is provided with the clip 29 on one half of the partition member 3 separated by the folding portion 10 in the front-rear direction and with the first rib 13a (arcuate rib) on the other half.

Such a vehicle body side structure C allows the partition member 3 to be folded at the folding portion 10 so that the other half provided with the first rib 13a hangs down due to its self-weight, when an assembly worker grips the one half provided with the clip 29 of the partition member 3. And, when the clip 29 is fitted into the round hole 30 on the upper surface 1a of the side sill 1, the first rib 13a (arcuate rib) comes into sliding contact with the upper surface 1a of the side sill 1 to lift up the other end portion of the partition member 3.

This allows the other end portion of the partition member 3 to easily face from below the inner wall in the front-rear direction of the center pillar 2 that curves to be convex downward, which more securely brings the other end portion of the partition member 3 and the inner wall of the center pillar 2 into the close contact when the foamable resin is filled in the hollow portion 8 of the center pillar 2.

Furthermore, the vehicle body side structure C is provided with the second rib 13b (upside-down triangular rib) on a portion of the partition member, which portion is located opposite to the folding portion 10 across the clip 29 in the front-rear direction.

Such a vehicle body side structure C is able to make the second rib 13b abut against the upper surface 1a of the side sill 1, and thereby to easily position the partition member 3 with respect to the upper surface 1a. Additionally, the vehicle body side structure C is able to restrict the partition member 3 from moving when the partition member 3 is being fixed in the hollow portion 8 of the center pillar 2.

The vehicle body side structure C has only one clip 29 provided on the partition member 3.

According to the vehicle body side structure C, the partition member 3 is able to be positioned and fixed at a predetermined position only if this one clip 29 is fitted into the upper surface 1a of the side sill 1, which makes easier the fitting of the partition member 3 in the vehicle body side structure C. Moreover, such a vehicle body side structure C allows to configure the partition member 3 in a simple structure.

Note that the vehicle body side structure C needs no clip on the other half having the first rib 13a (arcuate rib) opposite to the one half having the clip 29, which halves sandwich the folding portion 10, because the other half is able to be positioned by the first rib 13a.

Furthermore, the vehicle body side structure C has the clip 29 formed substantially at the center of the partition member 3 in the front-rear direction.

Such a vehicle body side structure C allows the partition member 3 to be easily fixed onto the upper surface 1a of the side sill 1. Additionally, this vehicle body side structure C enables the partition member 3 to be fixed to the side sill 1 with a good balance in the front-rear direction, which may allow the vehicle body side structure C to reduce the load applied on the clip 29.

Furthermore, the vehicle body side structure C provides the partition member 3 with the third rib 13c (baffle rib) in a manner of facing the foamable-resin filling hole 15 of the center-pillar inner part 6.

Such a vehicle body side structure C, when the foamable resin is being filled into the hollow portion 8 of the center pillar 2, makes the third rib 13c (baffle rib) guide the uncured foamable resin to a location suitable for foaming as described above, which allows the vehicle body side structure C to more reliably spread the foam object from the foamable resin evenly all aver the foamable-resin chamber 17.

In addition, the vehicle body side structure C has the third rib 13c inclined obliquely with respect to the vehicle width direction, and therefore, is able to regulate the flow of the foamable resin in the hollow portion 8 to efficiently fill the foamable resin into the hollow portion 8.

Furthermore, the vehicle body side structure C is provided with the wall portion 16 extending upward from the upper surface of the partition member 3 above the clip 29 of the partition member 3.

Such a vehicle body side structure C allows an assembly worker to easily handle the partition member 3 within the hollow portion 8 of the center pillar 2 by gripping the wall portion 16. Additionally, the vehicle body side structure C allows the assembly worker to grip the wall portion 16 to fix the clip 29 to the upper surface 1a of the center pillar 1, which improves the fixing workability.

Furthermore, the vehicle body side structure C is provided with the clip 29 on the lower surface of the recess portion 18.

Such a vehicle body side structure C allows the fitting worker to grip the partition member 3 while putting a finger inside an inner peripheral of the bottomed cylindrical recess portion 18. This allows the fitting worker to easily handle the partition member 3 within the hollow portion 8 of the center pillar 2 by gripping the recess portion 18. In addition, the vehicle body side structure C enables the fitting worker to fix the clip 29 on the upper surface 1a of the center pillar 1 while gripping the recess portion 18, which improves the fixing workability.

Although the description is given of the present embodiment as described above, this invention is not limited to the above embodiment and may be implemented in various embodiments.

Although the above embodiment has the wall portion 16 formed in the cylindrical shape gripped by a fitting worker, the shape of the wall portion 16 is not limited thereto. Further, the recess portion 18 is not limited to the bottomed cylindrical shape.

Accordingly, for example, the wall portion 16 may be a cylindrical body having another shape such as a square cylinder, or may be formed of a plate extending outward from the partition main body 9.

In addition, the above embodiment has the first rib 13a (arcuate rib) whose rear side 21b only is arcuate, however, the first rib 13a (arcuate rib) may be wholly in a semicircle shape.

REFERENCE SIGNS LIST

1: Side sill
1a: Upper surface of side sill
2: Center pillar
3: Partition member
4: Side-sill inner part
5: Side-sill outer part
6: Center-pillar inner part
7: Center-pillar outer part
8: Hollow portion of center pillar
9: Partition main body
9a: First half plate
9b: Second half plate
10: Folding portion
11: Side wall
11a: First side wall
11b: Second side wall
12: Vertical wall
12a: First vertical wall
12b: Second vertical wall
13: Rib
13a: First rib
13b: Second rib
13c: Third rib
13d: Fourth rib
14: Opening
15: Foamable-resin filling hole
16: Wall portion
17: Foamable-resin chamber
18: Recess portion
29: Clip
30: Round hole
C: Vehicle body side structure

CITATION LIST

Patent Literature

[PTL 1] Japanese Patent Application Publication No. 2003-237624 A

What is claims is:

1. A vehicle body side structure comprising:
a side sill extending in a vehicle front-rear direction of a vehicle body;
a center-pillar outer part extending upward from the side sill;
a center-pillar inner part disposed inward in a vehicle width direction from the center-pillar outer part; and
a partition member disposed in a hollow portion formed by the center-pillar outer part and the center-pillar inner part, the partition member extending in the vehicle front-rear direction,
wherein
both of end portions of the partition member in the vehicle front-rear direction are inclined downward,
a folding portion is included near a middle of the partition member in the vehicle front-rear direction, wherein the partition member is ridge-folded at the folding portion,
the partition member includes a first portion and a second portion that sandwich the folding portion in the vehicle front-rear direction,
the first portion is provided with clip extending downward;
the second portion is provided with a first rib extending downward; and
the first rib has an arcuate shape extending in the vehicle front-rear direction.

2. The vehicle body side structure according to claim 1, wherein
a second rib extending downward to abut against the side sill is provided on the first portion, the second rib being located opposite to the folding portion across the clip in the vehicle front-rear direction.

3. The vehicle body side structure according to claim 1, wherein
lower end portions of the center-pillar outer part and the center-pillar inner part are more inclined with respect to a top-bottom direction at their front sides than at their rear sides;
the clip is disposed substantially at a center of the partition member in the vehicle front-rear direction; and
the folding portion is located rearward of the clip in the vehicle front-rear direction.

4. A vehicle body side structure comprising:
a side sill extending in a vehicle front-rear direction of a vehicle body;
a center-pillar outer part extending upward from the side sill;
a center-pillar inner part disposed inward in a vehicle width direction from the center-pillar outer part; and
a partition member disposed in a hollow portion formed by the center-pillar outer part and the center-pillar inner part, the partition member extending in the vehicle front-rear direction,
wherein
both of end portions of the partition member in the vehicle front-rear direction are inclined downward,
the center-pillar inner part is provided with a hole between the side sill and the partition member, and
the partition member includes a rib extending downward while extending obliquely with respect to the vehicle width direction and located outward from the hole in the vehicle width direction.

5. The vehicle body side structure according to claim 1, wherein
the partition member includes a wall portion extending upward above the clip on an upper surface of the partition member.

6. The vehicle body side structure according to claim 5, wherein
the partition member includes:
a partition main body extending along the side sill;
a vertical wall portion extending upward in a top-bottom direction at each of both end portions of the partition main body in the vehicle front-rear direction; and
a recess portion recessed downward from the partition main body in a concave shape, and wherein
the clip is provided below a bottom surface of the recess portion.

* * * * *